United States Patent

[11] 3,630,552

[72] Inventor Edward J. Byron
Waltham, Mass.
[21] Appl. No. 25,934
[22] Filed Apr. 6, 1970
[45] Patented Dec. 28, 1971
[73] Assignee Sweetheart Plastics Inc.
Wilmington, Mass.

[54] HOSE COUPLING
4 Claims, 3 Drawing Figs.
[52] U.S. Cl. ........................................... 285/331,
285/367
[51] Int. Cl. ........................................... F16l 33/22
[50] Field of Search........................................... 285/365,
366, 367, 407, 409, 410, 411, 55, 331

[56] References Cited
UNITED STATES PATENTS
3,399,908 9/1968 Kurtz............................ 285/55
2,941,823 6/1960 Good............................ 285/410 X
2,077,035 4/1937 Bredeson...................... 285/55
3,199,879 8/1965 Fleming....................... 285/55 X
2,689,141 9/1954 Kiekhaefer................... 285/331 X FOREIGN PATENTS
598,864 10/1959 Italy............................. 285/365
1,580,750 7/1969 France......................... 285/365
430,351 2/1967 Switzerland................. 285/365

Primary Examiner—Thomas F. Callaghan
Attorney—Wolf, Greenfield & Sacks

ABSTRACT: A sanitary coupling for connecting the ends of flexible tubes to provide a continuous smooth flow passage therethrough. The coupling includes a fitting on the end of each tube. Each fitting includes an insert having a tubular portion and an enlarged flange portion at one end. The tubular portion fits snugly within the end of the hose with the exposed face of the flange in readiness to receive abuttingly the face of the flange on the other fitting. The edges of the tubular portion of the inserts located within their respective tubes are feathered in a fine taper to merge smoothly with the inner surface of the flexible tube. Each insert is retained in place by an outer sleeve which surrounds the end of the tube and which has a flange about its mating end. The outer surfaces of the flange on the outer sleeves are tapered to enable a locking band to be drawn tightly about the tapered outer flange and draw the fittings closely together. The abutting surfaces of the inserts are of male-female configuration to provide an effective seal.

PATENTED DEC 28 1971
3,630,552
FIG. 1
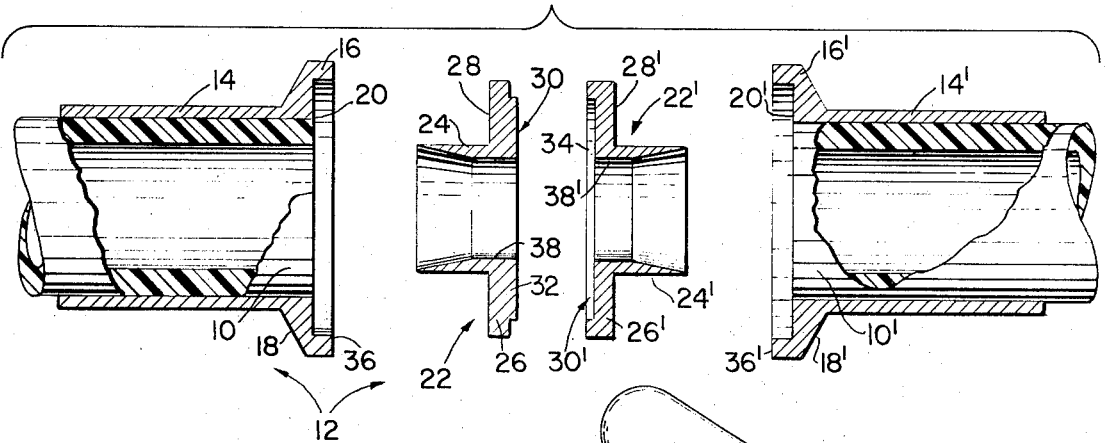
FIG. 3
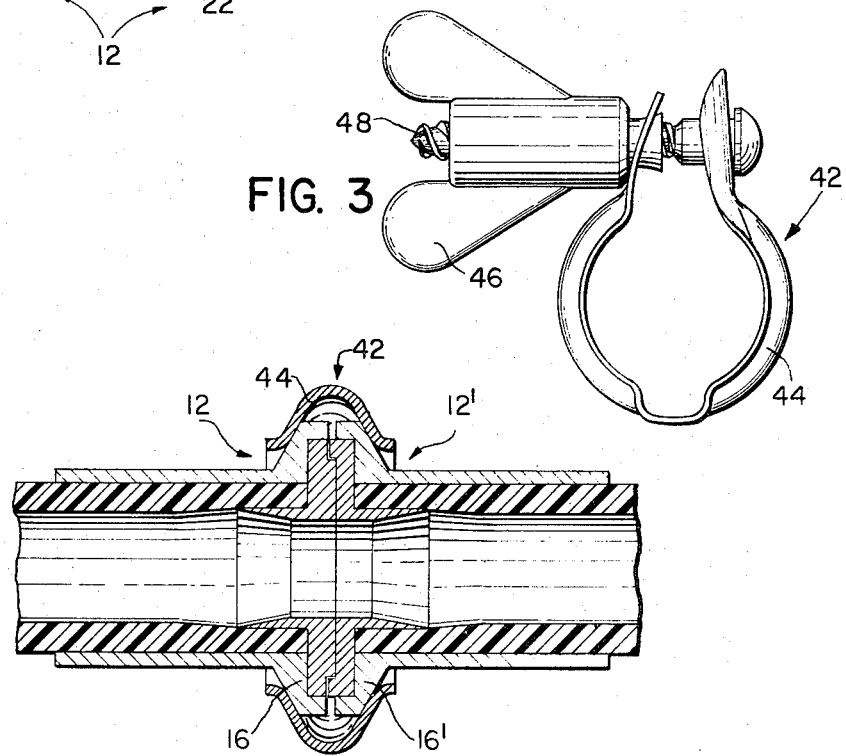
FIG. 2
INVENTOR
EDWARD J. BYRON
BY
Wolf, Greenfield, Hieken + Sacks
ATTORNEYS 3,630,552

HOSE COUPLING

BACKGROUND OF THE INVENTION

This invention relates to couplings for fluid-conducting tubes and more particularly, to a sanitary coupling having a minimum number of crevices or other obstructions which might tend to collect the fluid being handled and which might generate unsanitary conditions. Sanitary couplings of this type are particularly useful when handling fluids such as syrups or milk as in dairies or restaurants. It is particularly important that the connectors are maintained sanitary when the fluid being handled is intended for human consumption.

When handling such liquids, it has been common practice in the art to connect hoses or tubes by means of conventional "radiator-type" clamps in which one of the tubes is inserted into the end of the other tube and a band is drawn tightly about the outermost of the tubes, as by a screw arrangement, to seal the tubes. This technique is undesirable in that it results in unsanitary conditions. Furthermore, these connectors are not always easily connectable and disconnectable. In the conventional "radiator-type" connection a number of crevices and obstructions are presented along the flow passage of the mated tubes. These crevices tend to collect some of the material passing through the tubes. Thus, when handling milk, some may become trapped within the crevices defined by the tubes where it may coagulate and sour. Obviously, this is undesirable and unsanitary.

A further difficulty presented by currently employed connectors when employing such fluids is that as material collects within the crevices subsequent separation or disconnection of the coupling may be made some difficult. For example, if the fluid contains a normally crystalline material such as sugar or salt, this material may collect and crystallize in the crevices to lock the tubes together. Obviously when this occurs, connection and disconnection is not as quick and simple as might be desired.

SUMMARY OF THE INVENTION

It is among the primary objects of my invention to provide a coupling which presents no obstruction to the flow of fluid through the connected tubes and which enables the tubes to be joined in a manner presenting a continuous and flush tubular flow surface to the flowing liquid.

The coupling includes nearly identical fittings, there being one fitting secured to the end of each of the hoses to be connected. The fittings include finely machined abutting faces which are formed on the facing surfaces of flanges. The flanges are an integral part of inserts which fit snugly within the ends of the tubes. The abutting faces of the flanges fit in a shallow male-female connection and are machined finely to provide a close, snug fit. The insert of each fitting is retained within the end of the tube by an outer sleeve which surrounds the end of the tube and which has a circumferential flange having a tapered outer surface. When the fittings are mated, the flange portions of the outer sleeves can be wedged together by a specially designed circumferential band which extends about the registered flanges of the outer sleeves.

The coupling avoids the use of O-rings or grooves for such O-rings to effect the seal. The seal is provided primarily by the cooperative mating of the finely machined surfaces of the inserts and the manner by which the inserts are secured together.

The continuous flow channel defined within the connected tubes is unobstructed through the fitting and does not include any grooves or obstructions which would tend to entrap some of the fluid flowing through the fitting.

An additional feature of the invention resides in the quick connect-disconnect capability of the coupling. Once the locking band has been relaxed from about the locking flanges on the outer sleeve the mated inserts may be pulled apart simply with minimal force.

One of the objects of the invention is to provide a coupling for use with fluids which must be maintained in a hygienic, sanitary environment and in which the coupling does not entrap or retain any portion of the fluid flowing therethrough.

A further object of the invention is to provide a coupling of the type described which is the simple manufacture yet which provides a seal that is highly effective.

A further object of the invention is to provide a coupling for the ends of a pair of tubes to be connected which couples the tubes in a manner presenting a continuous, smooth and flush flow surface through the connection between the tubes.

A further object of the invention is to provide a coupling of the type described which may be connected and disconnected simply and quickly and which will not become stuck or frozen by reason of crystallization or coagulation of entrapped material within the tubes or coupling.

BRIEF DESCRIPTION OF THE DRAWINGS

These and other objects and advantages of the invention will be apparent from the foregoing detailed description thereof with reference to the accompanying drawings therein:

FIG. 1 is an exploded view of the tubes and elements of the coupling, partly in section and partly broken away;

FIG. 2 is a sectional view of the assembled tubes and coupling; and

FIG. 3 is an end view of the connected tubes illustrating the manner in which the coupling is locked together.

Each of the tubes and its associated fitting are of substantially identical construction except that one of the fittings includes a male connecting member and the other includes a receptive female connecting member. Fore ease of explanation, the tube and fitting including the male connection will be referred to as the first tube and fitting (shown at the left in FIG. 1) and the tube and fitting including the female connective part (shown at the right in FIG. 1) will be referred to as the second tube and fitting.

As shown in FIGS. 1 and 2, the first tube 10 may be formed from a flexible resilient inert plastic such as Tygon. The end of the tube to which the fitting is secured preferably is cut square. Each of the fittings indicated generally by the reference characters 12, 12' includes an outer sleeve 14, 14' which surrounds the end of the tube. Each of the outer sleeves 14, 14' has a circumferential flange 16, 16' which includes a continuous locking surface 18, 18' which diverges toward the free end of its associated tube 10, 10'. The opposite surface of each circumferential flange 16, 16' is formed with a recessed shoulder 20, 20'. The fittings 12, 12' preferably are formed from a material which is inert with respect to the liquids to be used and, in most instances, stainless steel is suitable.

Each of the fittings 12, 12' includes an insert 22, 22' which fits snugly and firmly within the end of its respective tubes 10, 10'. Each fitting 22, 22' includes a tubular portion 24, 24' and an integral abutting flange 26, 26'. The tubular portions 24, 24' are of greater diameter than the inner diameter of their respective tubes 10, 10' so that when assembled, as shown in FIG. 2, the end portions of the tubes 10, 10' will be compressed between each tubular portion 24 of the insert and its associated outer sleeve 14.

When assembling each fitting to its associated tube, the insert 22, 22' is pressed firmly into the open end of its associated tube 10, 10' until the square cut end of the tube bears against the surface 28, 28' of its associated insert 22, 22'. The outer sleeve 14, 14' which previously was placed about the tube 10, 10' then is urged along the tube toward the insert 22. When the sleeves 14, 14' are mated properly with their respective inserts 22, 22' and tubes 10, 10', the abutting flanges 26, 26' fit within and bear against the shoulders 20, 20' of their respective outer sleeve 14, 14'.

Both fittings 12, 12' are identical except that the mating surface 30 of the insert 22 is formed in a broad shallow male projection 32 whereas the mating surface 30' of the insert 22' defines a similarly broad shallow female socket 34 which receives the projection 32. The tolerances between these mating surfaces 30, 30' and their respective projection 32 and socket 34 are quire small and are finely machined to provide as perfect a fit as is practicably possible. As shown in FIG. 3, the facing surfaces 36, 36' of the outer sleeves 14, 14' are spaced when the parts are assembled and do not bear against each other. The only connection is provided by the mating male and female surfaces 30, 30' of the inserts 22, 22'. The inner bores 38, 38' of the mating inserts 22, 22' also are machined to close tolerances to provide a continuous flow surface through the coupling which is free of any crevices or obstructions. The edges of the tubular portions 24, 24' of the inserts 22, 22' are machined to a feather edge so that they will engage and merge smoothly with the inner surface of their associated tubes 10, 10' to continue the smooth uninterrupted flow surface for the liquid being handled.

The male projection 32 on the insert 22 and the receptive socket on the insert 22' are relatively shallow. This arrangement provides an adequate fluid proof seal yet enables the parts to be disconnected quickly and simply by either an axial pulling and separating motion or by bending the fittings apart. The shallow depth of the projection 32 permit either axial or bending separation.

When the parts are assembled as shown in FIG. 2, they are locked together by a locking band 42 of generally U-shaped cross-sectional configuration. The locking band 42 has radially, inwardly diverging walls 44 which define an inner circumferential channel receptive to the combined circumferential flanges 16, 16' of the outer sleeves 14, 14'. The locking band 42 is tightened about the flanges 16, 16' by a wingnut 46 and a cooperative screw 38. The screw and nut preferably are double-threaded to enable the locking band 42 to be tightened firmly within one or two turns. The portion of the locking band opposite the wingnut and screw 46, 48 is flattened to facilitate flexure of the blocking band 42. As the wingnut 46 is tightened the walls 44 of the locking band 42 are drawn tightly about and into engagement with the divergent locking surfaces 18, 18' of the flanges 16, 16' to wedge the flanges 16, 16' and the inserts 22, 22' together. After the nut 46 has been tightened, the connection is complete and fluidproof.

Thus, I have provided a fluid coupling which is free of obstructions or crevices and which presents a smooth continuous surface through which the fluid may flow. Additionally, the coupling may be connected or disconnected quickly and simply for cleaning or other purposes.

It should be understood that the foregoing description of my invention is intended merely to be illustrative thereof and that other modifications and embodiments thereof will be apparent to those skilled in the art without departing from its spirit. For example, although the coupling has been described as employed to connect two tubes of generally identical dimensions, the tubes may be of different diameters provided that their associated outer sleeves 14, 14' and inserts 22, 22' mate properly particularly in the regions of the circumferential flanges 16, 16' and mating surfaces 30, 30'. Additionally, although the invention is useful particularly when it is desired to maintain sanitary conditions the coupling may be employed with other fluids or material with which it is desired to provide an effective seal with an easily connectable coupling.

Having thus described the invention what I desire to claim and secure by Letters Patent is:

1. A hose coupling for connecting the ends of a first hose and a second hose comprising:

a hollow first insert having a tubular portion at one end thereof, said tubular portion being adapted to fit snugly within the end of said first hose, the edge of said tubular portion being feathered to merge smoothly with the internal surface of the first hose;

said first insert having an integral enlarged circumferential flange at the other end thereof, said flange having a facing surface formed thereon;

a hollow second insert having a tubular portion at one end thereof, said tubular portion being adapted to fit snugly within the end of said second hose, the edge of the said tubular portion being feathered to merge smoothly with the internal surface of said second hose;

said second insert having an integral enlarged circumferential flange at the other end thereof, said flange having a facing surface formed thereon;

said facing surfaces of said first and second inserts being of complimentary contour and being abuttingly mateable, said contours of said facing surfaces being constructed and arranged to present substantially continuous flow surface through said mated inserts, free of material entrapping crevices;

means for securing said inserts together in said mated relation;

said enlarged flanges of said first and second inserts projecting radially beyond the outer surfaces of their associated hoses;

a first, outer sleeve having an internal cylindrical surface of substantially constant diameter surrounding the end of said first hose and having a circumferential flange formed about one end thereof, said circumferential flange having a shoulder formed therein for receiving said flange of said first insert, said tubular portion of said first insert and said first outer sleeve cooperating to squeeze the end of said second hose therebetween;

a second, outer sleeve having an internal cylindrical surface of substantially constant diameter surrounding the end of said second hose and having a circumferential flange formed about one end thereof, said circumferential flange having a shoulder formed therein for receiving said flange of said second insert, said tubular portion of said second insert and said second outer sleeve cooperating to squeeze the end of first hose therebetween; and means for urging said sleeves together to secure said inserts together in said mated relation.

2. A hose coupling as defined in claim 1 wherein said means for securing said inserts together in said mated comprises:

each of said outer circumferential flanges on said sleeves having an outer, locking surface which diverges toward the free end of its associated sleeve whereby when said fittings are mated said locking surfaces of said first and second sleeves define a combined tapered locking flange; and a locking band of generally U-shaped cross section, said locking band being adapted to wrapped about said tapering circumferential locking flange, said locking band having sidewalls adapted to engage the locking surface of said locking flange; and means for drawing firmly said band about said combined flanges to wedge said fittings together.

3. A hose coupling as defined in claim 2 wherein said sleeves and said inserts are dimensioned so that when locked, said first and second sleeves are spaced whereby the full locking force of said locking band is applied to the mating surfaces of said inserts.

4. A hose coupling as defined in claim 3 wherein said first facing surface includes a male boss formed thereon and extending normally therefrom;

said second facing surface having a female socket formed thereon receptive to said boss, said mating surfaces defining a mechanical interlock therebetween separable axially or by bending said mated along their longitudinal axis.

* * * * *